United States Patent
Huang et al.

(10) Patent No.: US 7,524,915 B2
(45) Date of Patent: Apr. 28, 2009

(54) PROCESS FOR MAKING MOISTURE-CURABLE SILYLATED RESIN COMPOSITION, THE RESULTING COMPOSITION AND MOISTURE-CURABLE PRODUCTS CONTAINING THE COMPOSITION

(75) Inventors: Misty Huang, New City, NY (US);
Frank D. Medicino, Marietta, OH (US);
Yurun Yang, Shanghai (CN); Jeries I. Nesheiwat, Yonkers, NY (US); Brendan J. O'Keefe, Parkersburg, WV (US)

(73) Assignee: Momentive Performance Materials Inc., Albany, NY (US)

( * ) Notice: Subject to any disclaimer, the term of this patent is extended or adjusted under 35 U.S.C. 154(b) by 137 days.

(21) Appl. No.: 11/260,598

(22) Filed: Oct. 27, 2005

(65) Prior Publication Data

US 2007/0100108 A1    May 3, 2007

(51) Int. Cl.
*C08G 77/18*   (2006.01)
*C08G 77/26*   (2006.01)
*C08G 18/10*   (2006.01)
*C08G 18/71*   (2006.01)
*C07F 7/10*    (2006.01)
*C07F 7/18*    (2006.01)

(52) U.S. Cl. .............................. 528/28; 528/29; 528/44; 528/59; 528/69; 528/85; 556/414; 556/420

(58) Field of Classification Search ..................... 528/29
See application file for complete search history.

(56) References Cited

U.S. PATENT DOCUMENTS

| 4,345,053 | A  | 8/1982  | Rizk et al.     |
| 4,625,012 | A  | 11/1986 | Rizk et al.     |
| 5,990,257 | A  | 11/1999 | Johnston et al. |
| 6,103,850 | A  | 8/2000  | Reichel et al.  |
| 6,310,170 | B1 | 10/2001 | Johnston et al. |
| 6,369,187 | B1 | 4/2002  | Fujita et al.   |
| 6,762,270 | B2 | 7/2004  | Ludewig et al.  |
| 6,833,423 | B2 | 12/2004 | Roesler et al.  |

FOREIGN PATENT DOCUMENTS

| DE | 10237271 A1     | 3/2004 |
| EP | 0931800 A1      | 7/1999 |
| WO | WO 2005/042607 A1 | 5/2005 |

OTHER PUBLICATIONS

Hsu, Infrared Spectroscopy, p. 247-249 (http://www.prenhall.com/settle/chapters/ch15.pdf).*

* cited by examiner

*Primary Examiner*—Randy Gulakowski
*Assistant Examiner*—Robert Loewe
(74) *Attorney, Agent, or Firm*—Dominick G. Vicari

(57) ABSTRACT

A process is provided for making a moisture-curable silylated resin composition by reacting (i) at least one polyol, (ii) at least one polyisocyanate and (iii) at least one isocyanatosilane, optionally in the presence of catalyst, wherein the NCO/OH ratio is less than 1. The resulting moisture-curable silylated resin composition is useful in the manufacturer of each product as moisture-curable sealants, coatings and adhesives.

11 Claims, No Drawings

PROCESS FOR MAKING MOISTURE-CURABLE SILYLATED RESIN COMPOSITION, THE RESULTING COMPOSITION AND MOISTURE-CURABLE PRODUCTS CONTAINING THE COMPOSITION

FIELD OF THE INVENTION

The present invention relates to processes for making moisture-curable silylated resin compositions, moisture-curable silylated resin compositions, and moisture-curable products containing the same.

BACKGROUND OF THE INVENTION

Urethane polymers have in the past been modified to modulate their functionality by endcapping some or all of the isocyanate groups with a variety of organosilanes to yield silane end-capped urethane polymers containing minimal or no isocyanate groups.

The production of isocyanato terminated polyurethane polymers by the reaction of polyurethane prepolymer with an organosilane having one or more hydrolyzable alkoxysilane groups is known in the art. The polyurethane prepolymer used must have terminal active hydrogens. These terminal hydrogens can be present in groups such as hydroxyl groups, mercapto groups, or primary or secondary amino groups. These active hydrogen atoms are reacted with an isocyanate group present in the organosilane compound. The hydroxyl compounds are used in molar excess with respect to the polyisocyanate so that the resulting reagents have hydroxyl terminals.

The endcapping procedure used when making these polymers involves a sequential reaction mechanism. In other words, the endcapping silanes must be added when the NCO % is at or very close to zero, in order to obtain sufficient yields of silane-terminated polyurethane prepolymers (SPUR) having the desired viscosity and properties. For example, a conventional process used to make a silane-terminated polyurethane reacts polymer diols with isocyanate first and then adds functional silane to cap the ends of the terminates once the NCO % is close or at zero. If the silane end-cappers are added prematurely, i.e. before the NCO % is close or at zero, the properties of the polymer resulting varies greatly. In fact, it is a great challenge for manufactures to determine and then cap the SPUR prepolymers accurately in order to obtain consistent properties from batch to batch.

In view of the foregoing, what is needed is a process for producing moisture-curable silylated resin compositions wherein the addition of silane endcappers can be done at anytime during the reaction mechanism with little or no variation in the properties of the resulting silylated resin compositions. This process would decrease the variation of SPUR prepolymers form batch to batch. In other words, the resulting prepolymer resin compositions would have the same or similar viscosity and other properties regardless of the order in which the silane endcappers were added to the reaction. The process described herein and the products produced from the claimed processes overcome the problems of the prior-art.

SUMMARY OF THE INVENTION

One aspect of the invention is directed to a process for making a moisture-curable silylated resin composition comprising reacting in the presence or absence of catalyst at least one polyether polyol (i), at least one polyisocyanate (ii) and at least one isocyanatosilane in any combination and/or order of addition, the NCO/OH ratio of the polyisocyanate (ii) and polyol (i) being from about 0.1 to about 0.9 and the NCO/OH ratio of isocyanatosilane (iii) and polyol (i) being from about 0.9 to about 0.1, provided, when polyol (i) and polyisocyanate (ii) are reacted to produce hydroxyl-terminated polyurethane prepolymer prior to completion of the polyurethane prepolymer-forming reaction, isocyanatosilane is added to the reaction medium to produce silylated polyurethane.

The process of the present invention produces silylated moisture-curable resin compositions having little or no variation in their properties from batch to batch regardless of when the silane endcappers are added to the reaction mixture. This is a clear advantage over conventional processes used to make a silane-terminated polyurethane that must react polyether diols with isocyanate first and then add functional silane to cap the ends of the terminates once the NCO % is zero. In the conventional processes, if the silane end-cappers are added prematurely, i.e. before the theoretical capping point where the NCO % is close or at zero, the properties of the polymer resulting varies greatly. In fact, it is a great challenge for manufactures to identify when the NCO % is zero so that functional silane can be added to the mixture in order to cap the SPUR prepolymers and produce a composition having consistent properties from batch to batch. Using the process of the present invention, identifying when the NCO % is zero is not necessary and therefore eliminates a step which has proven to be a great challenge for manufactures attempting to produce silylated moisture-curable resin compositions having consistent properties from batch to batch.

Another aspect of the invention is directed to moisture-curable silylated resin compositions produced by a process for making a moisture-curable silylated resin composition comprising reacting in the presence or absence of catalyst at least one polyether polyol (i), at least one polyisocyanate (ii) and at least one isocyanatosilane in any combination and/or order, the NCO/OH ratio of the polyisocyanate (ii) and polyol (i) being from about 0.1 to about 0.9 and the NCO/OH ratio of isocyanatosilane (iii) and polyol (i) being from about 0.9 to about 0.1, provided, when polyol (i) and polyisocyanate (ii) are reacted to produce hydroxyl-terminated polyurethane prepolymer prior to completion of the polyurethane prepolymer-forming reaction, isocyanatosilane is added to the reaction medium to produce silylated polyurethane.

As used herein, the term "polyisocyanate" means an organic compound having two or more than two isocyanate groups and mixture thereof. As used herein, the term "polyol" means a compound having two or more hydroxy groups thereon and mixtures thereof.

Unless otherwise indicated herein, "alkyl" may be linear, branched or cyclic; "aryl" includes alkaryl groups such as tolyl, and aralkyl groups such as benzyl; and "alkylene" may be linear, branched or cyclic and includes alkylene groups having pendent or internal aryl groups such as 1,4-diethylenephenylene.

DETAILED DESCRIPTION OF THE INVENTION

One aspect of the invention is directed to a process for making a moisture-curable silylated resin composition comprising reacting in the presence or absence of catalyst at least one polyether polyol (i), at least one polyisocyanate (ii) and at least one isocyanatosilane in any combination and/or order of addition, the NCO/OH ratio of the polyisocyanate (ii) and polyol (i) being from about 0.1 to about 0.9 and the NCO/OH ratio of isocyanatosilane (iii) and polyol (i) being from about 0.9 to about 0.1, provided, when polyol (i) and polyisocyanate (ii) are reacted to produce hydroxyl-terminated polyurethane prepolymer prior to completion of the polyurethane prepolymer-forming reaction, isocyanatosilane is added to the reaction medium to produce silylated polyurethane.

Unlike processes for making moisture-curable silylated resin compositions that are currently available, the current process adds isocyanatosilanes before the NCO/OH percentage is zero, the theoretical capping point. In other words, at least one polyol (i), at least one polyisocyanate (ii) and at least one isocyanatosilane (iii) may be reacted in any combination and/or order of addition. The moisture-curable resin composition produced using the described processes is found not to materially differ in viscosity and other properties regardless of when the silane endcappers where added to the reaction.

The processes for making a silylated resin composition described above may use a polyisocyanate that is aliphatic, cycloaliphatic, araliphatic or an aromatic polyisocyanate. The polyisocyanates used may be selected from the group consisting of ethylene diisocyanate, 1,6-hexamethylene diisocyanate, isophorone diisocyanate, cyclohexane-1,4-diisocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates, polymeric diphenylmethane diisocyanate, cyclohexane diisocyanate, and phenylene diisocyanate thereof.

The isocyanatosilane used in the processes described above may have the formula:

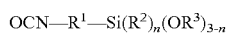

OCN—R$^1$—Si(R$^2$)$_n$(OR$^3$)$_{3-n}$

R$^1$ is an alkylene group having from 1-10 carbon atoms, R$^2$ and R$^3$ each are the same or different alkyl groups from 1-10 carbon atoms, and n is 0, 1, or 2.

Particular isocyanatosilanes that are useful in the invention are isocyanatosilane selected from the group consisting of 3-isocyanatopropylmethyldimethoxysilane, 3-isocyanatopropyltrimethoxysilane and 3-isocyanatopropyltriethoxysilane.

One aspect of the invention is directed to the processes for making a silylated moisture-curable resin composition described above wherein polypropylene ether diol (PPO), diisocyanate and isocyanatosilane are used and the PPOs used in these processes have an average number molecular weight of between about 2,000 and about 20,000. Preferably the PPOs used in these processes have an average number molecular weight of about 4000 or higher and more preferably of about 8000 or higher. The diisocyanate used can be either aliphatic or aromatic, preferably isophorone diisocyanate (IPDI). The reaction can be carried out in a temperature range between about 50 degrees Celsius and about 120 degrees Celsius with or without catalyst.

The catalysts used can be heavy metals such as Tin, Bismuth, or Zirconium. Other suitable catalysts include, but are not limited to, organometallic catalysts, amine catalysts, and the like. In particular, catalyst for the silane-terminated polyurethane prepolymer and polyol reaction is selected from the group consisting of organic dibutyltin, Di-metallic cyanide, (DMC), zirconium complex, aluminum chelate, titanic chelate, organic zinc, organic cobalt, organic iron, organic nickel and organobismuth, and mixtures thereof. Amine catalyst can be selected from the group consisting of primary amine, secondary amine, tertiary amine and aminosilane and mixtures thereof. Catalyst for the silane-terminated polyurethane prepolymer and polyol reaction may also use a mixture of organometallic catalyst and amine catalyst.

Double metal cyanide complex catalysts (DMC catalysts) such as non-stoichiometric zinc hexacyanocobaltate glyme complexes are able to produce polyether polyols with low monol content, as reflected by levels of unsaturation of 0.003 mq/g or lower, to about 0.010 mq/g. In other words, the use of these DMC catalysts for the preparation of polyether polyols reduces the content of mono-functional polyethers with terminal double bonds, the so-called "mono-ols", in comparison to the preparation of polyether polyols with alkali catalysts, such as alkali metal hydroxides. Moreover, the polydispersity of these polyols is exceptionally low. Polyether polyols produced by DMC catalysts can be used to process high-quality polyurethanes (e.g. elastomers, foams and coatings). DMC catalysts are usually obtained by reacting an aqueous solution of a metal salt with an aqueous solution of a metal cyanide salt in the presence of an organic complexing ligand, e.g., ether. In a typical DMC catalyst preparation, aqueous solutions of zinc chloride (in excess) and potassium hexacyanocobaltate are mixed to form dispersion. Dimethoxyethane (glyme) is then added to the dispersion. After filtering and washing the dispersion with the aqueous glyme solution, an active catalyst is produced.

Still another aspect of the invention is directed to moisture-curable silylated resin compositions produced by the processes described above. In other words, moisture-curable silylated resin compositions produced by a process comprising reacting in the presence or absence of catalyst at least one polyether polyol (i), at least one polyisocyanate (ii) and at least one isocyanatosilane in any combination and/or order of addition, the NCO/OH ratio of the polyisocyanate (ii) and polyol (i) being from about 0.1 to about 0.9 and the NCO/OH ratio of isocyanatosilane (iii) and polyol (i) being from about 0.9 to about 0.1, provided, when polyol (i) and polyisocyanate (ii) are reacted to produce hydroxyl-terminated polyurethane prepolymer prior to completion of the polyurethane prepolymer-forming reaction, isocyanatosilane is added to the reaction medium to produce silylated polyurethane.

Preferably, the moisture-curable silylated resin compositions of the present invention are produced from a process that reacts polypropylene diol (PPO) with diisocyanate and isocyanatosilane wherein the NCO/OH molar ratio is between about 0.1 and about 0.9, preferably between about 0.4 and about 0.75 and the PPOs used have an average molecular weight of about between about 2,000 and about 20,000. Preferably the PPOs used in these processes have an average number molecular weight of about 4000 or higher and more preferably of about 8000 or higher. The diisocyanate used can be either aliphatic or aromatic, preferably isophorone diisocyanate (IPDI). These resin compositions can be made by carrying out the reaction in a temperature range between about 50 degrees Celsius and about 120 degrees Celsius with or without catalyst. The catalysts used can be heavy metals such as Tin, Bismuth, or Zirconium.

Another aspect of the invention is directed to moisture-curable silylated resin compositions made by any of the processes described above wherein the isocyantosilane used has the formula:

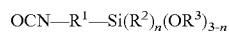

OCN—R$^1$—Si(R$^2$)$_n$(OR$^3$)$_{3-n}$

R$^1$ is an alkylene group having from 1-10 carbon atoms, R$^2$ and R$^3$ each is the same or different alkyl groups from 1-10 carbon atoms, and n is 0, 1, or 2.

A moisture-curable resin composition made by reacting a polyether diol, preferably polypropylene ether diol, a diisocyanate, and an isocyanatosilane possessing a single isocyanato group is also part of the invention.

Still another aspect of the invention is directed to moisture-curable products comprising at least one moisture-curable silylated resin composition of the invention and at least one additional ingredient selected from the group consisting of plasticizers, resins, defoamers, UV stabilizers, viscosity controllers, fragrances, dyes, fillers, preservative, antioxidants, carbon black, titanium oxide, clays, calcium carbonate, surface treated silicas and mixtures thereof. This list, however, is not comprehensive and is given merely as illustrative.

The antioxidants that may be added to the polymers or their solutions provide protection against oxidative changes. The preservatives that may be added to the polymers or their solutions protect the aqueous solution against contamination by microorganisms. The quantities in which such additives are used vary within wide limits, i.e. from 0.01 to 100% by weight and, more particularly, from 0.01 to 30% by weight, based on the polyurethane solution.

The moisture-curable products can be used as adhesives, sealants, coatings, and sealant additives such as fillers, reinforcers, and the like. For formulation in sealant compositions, the silylated resin composition of the present invention are combined with fillers and additives known in the prior art for use in elastomeric compositions. By the addition of such materials, physical properties such as viscosity, flow rate, sag, and the like can be modified. To prevent premature hydrolysis of the moisture-curable groups of the composition, the filler should be thoroughly dried before admixture therewith.

Upon exposure of the moisture-curable silylated resin compositions to moisture, for example atmospheric moisture, the silane groups will hydrolyze, possibly with intermediate formation of siloxane (—Si—O—Si—) bonds which lead to curing and bonding of the material to a substrate, such as glass, wood, metal, and the like.

In order to illustrate various illustrative embodiments of the present inventions, the following examples are provided.

EXAMPLE 1

This Example describes the reaction of Acclaim 8200 (a polyoxypropylene diol available from Bayer Corporation) with IPDI and capped by isocyanatosilane. The SPUR prepolymers were synthesized according to the "Separate process" wherein the silane endcappers were added at the calculated capping point, i.e. when the isocyanate concentration is less than 0.1%, and according to the "Together process" wherein the silane endcappers were added together with IPDI in the beginning of the reaction.

The SPUR prepolymer of Example 1 is based on the following formulation:

TABLE 1

| Materials | Parts |
| --- | --- |
| Acclaim 8200 | 150 g |
| IPDI | 2.1 g |
| A-Link35 | 3.84 g |
| (Isocyanatopropylthrimethoxysilane) | |
| SUL-4 (DBTDL): | 10-30 ppm based on polyol. |

The detailed process is as follows:

Separate process: 150 grams of Acclaim 8200 was added to a Kettle (the moisture concentration should be less than 200 ppm by Karl Fisher titration). The Kettle was heated to 80° C. (or 120° C.) while stirring under a blanket of nitrogen gas until the moisture concentration was reduced below 200 ppm. 10-30 ppm, the amount based on the amount of polyol, of the catalyst Fomrez SUL-4 available from Crompton was added to the Kettle using a GC syringe. After the catalyst has been well mixed in the Kettle, 2.1 gram of IPDI was added. The concentration of isocyanate (NCO) was monitored by titration. When the isocyanate (NCO) concentration reached the theoretical silane capping point, e.g. 0% NCO, the silane capping agent A-Link 35 was added and the reaction was continued at 65° C. until no free NCO could be detected.

Together process: 150 grams of Acclaim 8200 was added to a Kettle (the moisture concentration should be less than 200 ppm by Karl Fisher titration). The Kettle was heated to 80° C. (or 120° C.) while stirring and adding nitrogen gas. 10-30 ppm, the amount based on the amount of polyol, of the catalyst Fomrez SUL-4 available from Crompton was added to the Kettle using a GC syringe. After the catalyst has been mixed in the Kettle, 2.1 grams of IPDI and 3.84 grams of the silane-capping agent A-Link 35 were added together to the Kettle. The isocyanate content was monitored by titration. The reaction was continued to run at 65° C. until no free NCO could be detected. The experimental results for adding the silane endcapper by using the "Together process" and the "Separate process" are described in the table below:

TABLE 2

| Temperature (° C.) | DBTBL (ppm) | Order of addition | Reaction time min | Viscosity after 2 days (cps) | Tensile Str. (psi) | Elongation % |
| --- | --- | --- | --- | --- | --- | --- |
| 120 | 20 | separate* | 34 | 71,000 | 94 | 153 |
| 120 | 20 | together** | 22 | 63,000 | 70 | 121 |
| 80 | 30 | separate | 120 | 63,000 | 95 | 159 |
| 80 | 30 | together | 80 | 40,000 | 90 | 163 |

Together**—the silane endcappers were added together with IPDI.
Separate*—the silane endcappers were added at the capping point.

EXAMPLE 2

This Example describes the reaction of Acclaim 12200 with IPDI and then capped by isocyanatosilane before the calculated capping point:

400 g of polypropylene oxide, MW12000 (Acclaim 12200 available from Bayer Corporation) was added to a 1 L resin Kettle. Nitrogen was sparged into the Kettle at 60° C. and agitated until the moisture concentration was reduced below 200 ppm, 3.70 g (0.90 weight %) of isophoron diisocyanate (Desmondur I D230 available from Bayer Corporation) were added to the Kettle along with 7.5 ppm of dibutyltin dilaurate (Fomrez SUL-4 available from Crompton). The reaction was carried out at 75° C. 8 g (1.97 wt %) of isocyanatopropyl trimethoxysilane was added to Kettle at the theoretical calculated capping point, zero NCO %, or before reaching the capping point, e.g. at 0.03 or 0.06% NCO respectively. The reaction was allowed to continue at 75° C. until the NCO % reached zero as confirmed by titration. The experimental results for adding the silane endcapper at different points in the process are listed in the table below:

TABLE 3

| Book # | Rx temp. (° C.) | Cap @ NCO % | final viscosity cP | Tensile Strength (psi) | Young's Modulus (psi) | Elongation % |
| --- | --- | --- | --- | --- | --- | --- |
| TT-92-53 | 75 | 0.00 | 37,140 | 58.4 | 53.2 | 323.2 |
| TT-92-58 | 75 | 0.06 | 38,112 | 53.5 | 33.4 | 385.5 |
| TT-92-66 | 75 | 0.03 | 46,347 | 56.2 | 42.7 | 327.6 |

Conventional or theoretical capping point for this formulation should be at NCO % of zero, this set of reactions were capped at different points from 0.06 down to zero of NCO %. The prepolymer obtained from these reactions all have properties that are not materially different from each other regardless of when the silane endcapping was done.

EXAMPLE 3

This example reacts Acclaim 12200 with IPDI that is then capped by isocyanatosilane. The silane endcapping agent is added both separately and together with IPDI. Characteristics of the resulting prepolymers are then compared.

Separate addition (3600-144)

500 g of 97.32 wt % of Acclaim 12200 polyol was added to 1 L reactor. The Acclaim 12200 was agitated, sparged with nitrogen and heated at 85° C. until the moisture concentration is reduced below 200 ppm. At 85° C. (4.61 g, 0.90 wt %) was charged and allowed to mix for 5 minutes. 0.27 g of a 10 wt % solution in Proglyde DMM, 0.05 wt % of SUL-4 catalyst was added. Samples were removed from the reactor periodically for analysis of viscosity and isocyanate concentration. When the isocyanate concentration dropped to 0.08%, 8.89 g, 1.73 wt % of A-Link 35 was added and allowed to mix and react further at 85° C. Samples were removed from the reactor periodically for analysis of viscosity and isocyanate concentration. The reaction was run to completion and the product was cooled and discharged from the reactor.

Co-addition (3618-4)

500 g, 97.21 wt % of Acclaim 12200 polyol was added to a 1 L reactor. The Acclaim 12200 was agitated, sparged with nitrogen and heated at 85° C. overnight. At 85° C., 4.61 g, 0.90 wt % of isophorone diisocyanate and 9.45 g, 1.84 wt % A-Link 35 were added and allowed to mix for 5 minutes. 0.27 g of a 10 wt % solution in Proglyde DMM, 0.05 wt % of SUL-4 catalyst was added. Samples were removed from the reactor periodically for analysis of viscosity and isocyanate concentration. The reaction was run to completion and the product was cooled and discharged from the reactor. The results are shown in the table below:

the invention not be limited to the particular embodiment disclosed as the best mode contemplated for carrying out the process of the invention but that the invention will include all embodiments falling within the scope of the appended claims.

What is claimed is:

1. A process for making a moisture-curable silylated resin composition comprising reacting in the presence or absence of catalyst at least one polyether polyol (i), at least one polyisocyanate (ii) and at least one isocyanatosilane (iii), the NCO/OH ratio of the polyisocyanate (ii) and the polyol (i) being from about 0.1 to about 0.9 and the NCO/OH ratio of the isocyanatosilane (iii) and polyol (i) being from about 0.9 to about 0.1, provided, when hydroxyl-terminated polyurethane prepolymer prior to completion of the polyurethane prepolymer-forming reaction wherein the hydroxyl-terminated polyurethane prepolymer reaction medium has an isocyanate concentration of at least 0.03 % NCO, isocyanatosilane (iii) is added to the reaction medium to produce silylated polyurethane and wherein the process is a two-step process comprising:
   (1) reacting polyol (i) with part of polyisocyanate (ii); and
   (2) reacting the composition of step (1) with the remaining part of polyisocyanate (ii) and all of isocyanatosilane (iii).

2. The process for making a moisture-curable silylated resin composition according to claim 1 wherein the hydroxyl-terminated polyurethane prepolymer reaction medium has an isocyanate concentration of about 0.06 % to about 0.08 % NCO.

3. The process for making a moisture-curable silylated resin composition according to claim 1 wherein the NCO/OH ratio of the polyisocyanate (ii) and the polyol (i) is between about 0.4 and about 0.75.

4. The process for making a moisture-curable silylated resin composition according to claim 1 wherein polyol (i) is a polyether diol, polyisocyanate (ii) is a diisocyanate and isocyanatosilane (iii) possesses a single isocyanate group.

5. The process for making a moisture-curable silylated resin composition according to claim 4 wherein the polyether diol is a polypropylene ether diol.

TABLE 4

| Reference | Temperature (° C.) | DBTBL (ppm) | Order of addition | Reaction time (min) | Viscosity after reaction (cps) | Tensile Strength (psi) | Elongation (%) |
|---|---|---|---|---|---|---|---|
| 3600-144 | 85 | 10 | cap early* | 330 | 55,000 | 64.2 | 251 |
| 3618-4 | 85 | 10 | together** | 240 | 45,000 | 59.2 | 303 |
| 3586-121 | 85 | 10 | cap early | 395 | 53,000 | 61.4 | 325 |
| 3586-122 | 85 | 10 | cap early | 372 | 46,000 | 63.4 | 326 |
| 3586-127 | 85 | 10 | together | 348 | 63,500 | 97.1 | 271 |
| 3586-130 | 85 | 10 | together | 400 | 56,000 | 67.9 | 321 |

Separate*—the silane endcappers were added at the capping point
Together**—the silane endcappers were added together with IPDI While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that 6. The process for making a moisture-curable silylated resin composition according to claim 4 wherein the polyol is a polypropylene ether diol having a number average molecular weight between about 2,000 and about 20,000.

7. The process for making a moisture-curable silylated resin composition according to claim 6 wherein the polyol is a polypropylene ether diol having a number average molecular weight of at least about 4,000.

8. The process for making a moisture-curable silylated resin composition according to claim 6 wherein the polyol is a polypropylene ether diol having a number average molecular weight of at least about 8,000.

9. The process for making a moisture-curable silylated resin composition according to claim 4 wherein the diisocyanate is selected from the group consisting of ethylene diisocyanate, 1,6-hexamethylene diisocyanate, isophorone diisocyanate, cylcohexane-1,4-disocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanate, polymeric diphenylmethane diisocyanate, cyclohexane diisocyanate, phenylene diisocyanate and mixtures thereof.

10. The process for making a moisture-curable silylated resin composition according to claim 4 wherein the isocyanatosilane (iii) corresponds to the general formula $$OCN-R^1-Si(R^2)_n(OR^3)_{3-n}$$

in which $R^1$ is an alkylene group having from 1-10 carbon atoms, $R^2$ and $R^3$ each are the same or different alkyl groups having from 1-10 carbon atoms, and n is 0, 1 or 2.

11. The process for making a moisture-curable silylated resin composition according to claim 10 wherein the isocyanatosilane is selected from the group consisting of 3-isocyanatopropylmethyldimethoxysilane, 3-isocyanatopropyltrimethoxysilane, 3-isocyanatopropyltriethoxysilane and mixtures thereof.

* * * * *